M. DUEBER.
FEEDER FOR GRAIN DRILLS.
APPLICATION FILED DEC. 6, 1913.

1,112,275.

Patented Sept. 29, 1914.
2 SHEETS—SHEET 1.

Witnesses
Philip E. Barnes
A. A. Hines

Inventor
Martin Dueber
By Victor J. Evans
Attorney

M. DUEBER.
FEEDER FOR GRAIN DRILLS.
APPLICATION FILED DEC. 6, 1913.

1,112,275.

Patented Sept. 29, 1914.
2 SHEETS—SHEET 2.

Witnesses
Philip E. Barnes
C. A. Hines

Inventor
Martin Dueber
By Victor J. Evans
Attorney

UNITED STATES PATENT OFFICE.

MARTIN DUEBER, OF TIPTON, MISSOURI, ASSIGNOR OF ONE-HALF TO W. F. QUIGLEY, OF TIPTON, MISSOURI.

FEEDER FOR GRAIN-DRILLS.

1,112,275.

Specification of Letters Patent. Patented Sept. 29, 1914.

Application filed December 6, 1913. Serial No. 805,095.

*To all whom it may concern:*

Be it known that I, MARTIN DUEBER, a citizen of the United States, residing at Tipton, in the county of Moniteau and State of Missouri, have invented new and useful Improvements in Feeders for Grain-Drills, of which the following is a specification.

This invention relates to a feeder for use in connection with grain drills, the primary object of the invention being to provide a feeder designed to overcome the irregular intermittent feed of the grain to the drills and to supply a continuous and regulated amount of the grain to the drill, while at the same time preventing the grain from banking up within the hopper or supply compartment.

A further object of the invention is to provide a grain feeder which will operate to feed the grain from opposite sides or points of the hopper to an intermediate outlet, whereby the grain will be positively gathered and uniformly distributed and also uniformly and continuously conveyed to the outlet.

A still further object of the invention is to provide a grain feeder embodying a hopper or compartment having an outlet and right and left hand feed screws or augers operating to carry the grain from opposite sides of the hopper toward the outlet, together with a guard or cover plate arranged to close the joint between the screws or augers and prevent choking of the grain therein and to guide and positively insure the feed of the grain to the outlet.

A still further object of the invention is to provide a feeder of the character described by which the feed of the grain to the feed screws by gravity will be insured, and whereby any desired number of feeders of the type disclosed may be operated from a common shaft.

The invention consists of the features of construction, combination and arrangement of parts herein fully described and claimed, reference being had to the accompanying drawings in which:—

Figure 1:
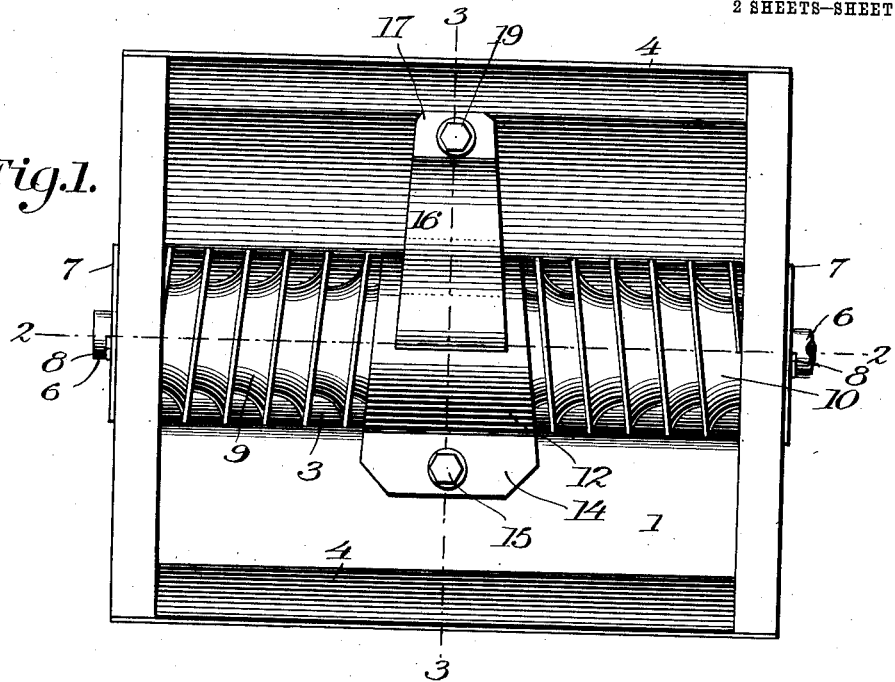
Figure 2:
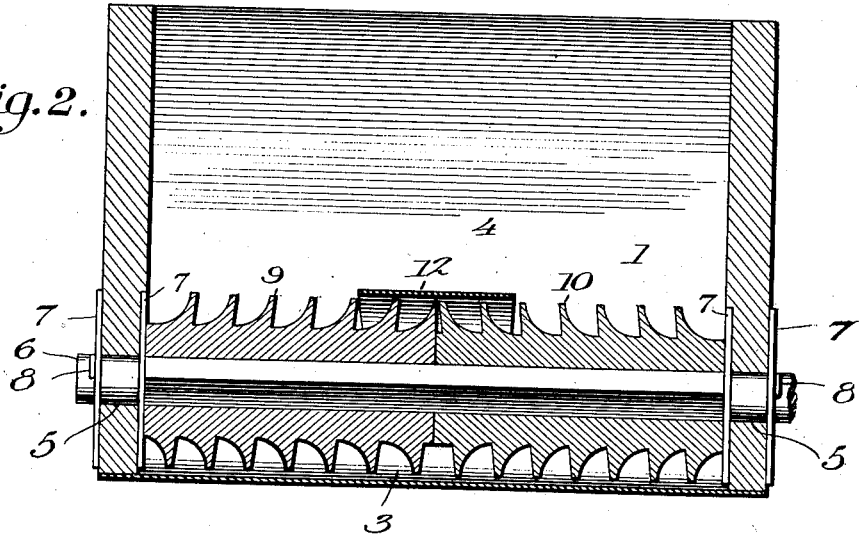
Figure 3:
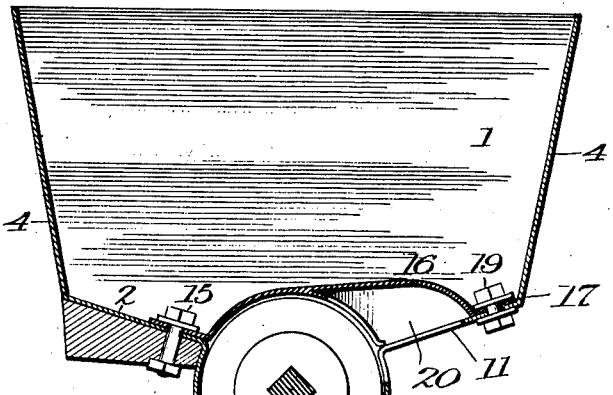
Figure 5:
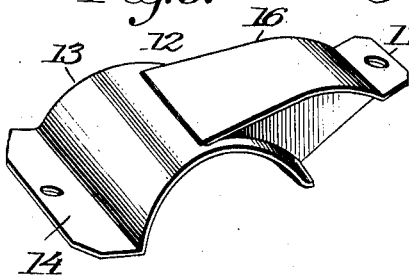
Figure 6:
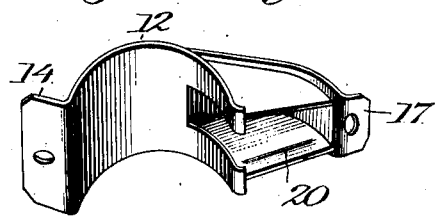
Figure 4:
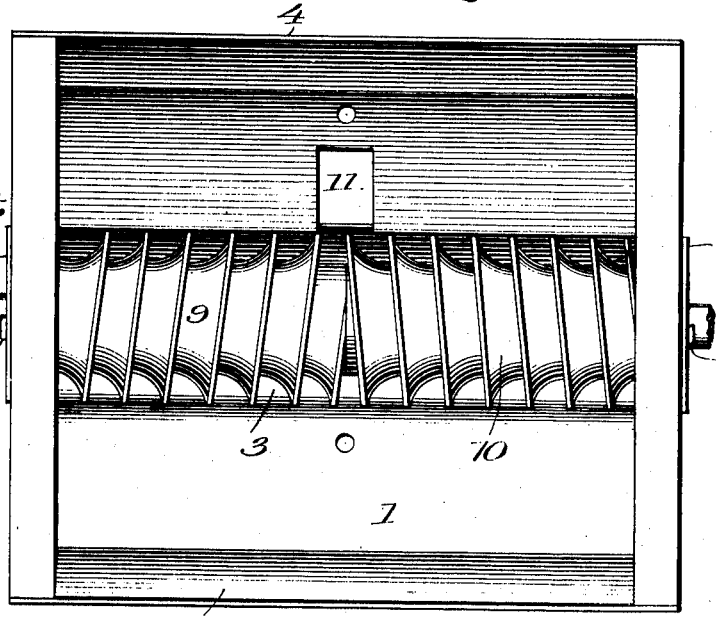

Figure 1 is a top plan view of a grain feeder constructed in accordance with my invention. Fig. 2 is a vertical longitudinal section on the line 2—2 of Fig. 1. Fig. 3 is a vertical transverse section on the line 3—3 of Fig. 1. Fig. 4 is a top plan view with the cover plate removed. Figs. 5 and 6 are top and bottom perspective views of the cover plate.

In the illustrated embodiment of the invention, I provide a hopper or compartment 1 to contain the grain, which hopper or compartment is provided with a bottom wall 2 having a central partially circular trough or depression 3, and sides 4 sloping downwardly and inwardly toward said depression. The end walls of the hopper are provided with bearing openings 5 in which is journaled a shaft 6, held from longitudinal displacement by disks or washers 7 and cotter pins or keys 8. Mounted on the shaft within the hopper are oppositely pitched or right and left hand feed screws or augers 9 and 10, which are partially seated in the trough or depression 3, and operate when the shaft is rotated in the proper direction to gather and feed the grain toward a central outlet 11 formed in one of the sloping sides 4 and intersecting the adjacent edge of the trough 3 at a point in line with the inner ends of the augers. The shaft is preferably of angular form in cross section and the augers are provided with correspondingly formed bores, by which they are mounted upon the shaft for rotation therewith, while at the same time by removing the keys 8 and outer disks or washers 7 the shaft may be withdrawn endwise, thus freeing the augers for removal. In practice, it will be understood that any desired number of hoppers or grain compartments may be employed, in connection with a corresponding number of sets of augers, and that all of these augers may be operated from one and the same shaft 6, the series of interdependent feeders thus produced being arranged to feed the grain from the supply hoppers or compartments to the different drills. It will be understood that the shaft may be connected with both ground wheels of the grain drill, so that the shaft and feed screws will operate continuously even when one wheel is checked by running into a depression in the ground, the other wheel keeping the shaft in motion.

Associated with the set of augers 9 and 10 is a guard or cover plate 12, having a semi-circular portion 13 to fit over the upwardly projecting portions of the inner ends of the auger screws and close the joint between them, so as to prevent the grain from above from entering between the adjacent ends of the screws and choking the working parts of the apparatus. At one end the plate is provided with an apertured flange 14 which laps over upon the rear sloping side 4 and is connected therewith by a bolt 15, while the opposite end of the plate is formed to provide a segmental hood 16 and an apertured end flange 17 secured to the front sloping side 4 by a bolt 19. The hood tapers longitudinally and is of somewhat less width than the plate, which is correspondingly tapered, and at its outer end the plate is provided with a feed aperture 20 for the passage of the grain from the inner ends of the augers into the hood and thence outward through the outlet 11. The hood covers the outlet and prevents the outflow of any grain except that positively fed to the outlet by the augers, as will be readily understood.

It will be evident from the foregoing description that in the operation of the feeder the augers will convey the grain from all sides of the base of the hopper or compartment, in which they are assisted by the flow of the grain by gavity to the depression 3 down the sloping sides 4, the augers feed uniform streams of grain through the depression and thence to the outlet, whereby banking and choking of the grain in the hopper will be prevented and an even, continuous and regulated feed of the grain to the outlet insured. The efficiency of operation of the device is materially increased by the provision of the depression 3 in which the grain tends to collect and by which the grain is retained in engagement with the threads of the augers. The guard plate may be detached at any time by simply removing its connecting bolts, for convenience in cleaning, repairing and replacing the parts, the shaft and augers being also readily removable as previously explained.

I claim:—

1. In a grain feeder, a hopper having an outlet intermediate of its ends, a shaft journaled upon the hopper, right and left hand augers carried by the shaft and operating to feed the grain inwardly to said outlet, and a guard secured to the hopper and having a partially circular portion covering the inner ends of the augers, said guard being provided with a hood covering the outlet with an entrance leading thereto in line with the inner ends of the augers.

2. In a grain feeder, a hopper provided with an outlet, a shaft journaled in the hopper, right and left hand augers carried by the shaft and operating to feed the grain inwardly to said outlet, and a guard provided with a portion covering the inner ends of the augers, a hood covering the outlet, and a passage between the hood and the space bound by said covering portion.

3. In a grain feeder, a hopper having a bottom provided with a depressed portion, sloping sides leading thereto, an outlet in one of said sloping sides centrally of the hopper and intersecting said depression, a shaft journaled upon the hopper in line with said depression, right and left hand augers carried by the shaft and operating to feed the grain inwardly to said central outlet, and a guard secured to the bottom of the hopper and having a partially circular portion covering the inner ends of the augers, said guard being provided with a hood covering the outlet and with an entrance leading thereto in line with the inner ends of the augers.

In testimony whereof I affix my signature in presence of two witnesses.

MARTIN DUEBER.

Witnesses:
EVERETT PIZIO,
J. B. NORMAN.